United States Patent
Tank et al.

[11] Patent Number: 5,560,716
[45] Date of Patent: Oct. 1, 1996

[54] BEARING ASSEMBLY

[76] Inventors: Klaus Tank, 9 Warbleton Avenue, Essexwold, Johannesburg, Transvaal; Peter N. Tomlinson, 315 Enford Road, Mondeor, Johannesburg, Transvaal; Oliver F. Damm, Wingate Park, Pretoria, Transvaal, all of South Africa

[21] Appl. No.: 570,197

[22] Filed: Dec. 11, 1995

Related U.S. Application Data

[63] Continuation of Ser. No. 217,932, Mar. 25, 1994, abandoned.

[30]   Foreign Application Priority Data

Mar. 26, 1993 [ZA]   South Africa ............................ 93/2167

[51] Int. Cl.⁶ .................................................... F16C 33/30
[52] U.S. Cl. ............................................ 384/492; 428/408
[58] Field of Search .................................. 428/408, 446; 384/492, 490

[56]             References Cited

U.S. PATENT DOCUMENTS

| | | | |
|---|---|---|---|
| 4,151,686 | 5/1979 | Lee et al. .................................. | 51/307 |
| 4,224,380 | 9/1980 | Bovenkerk et al. ..................... | 428/545 |
| 4,554,208 | 11/1985 | MacIver et al. ......................... | 428/408 |
| 4,560,014 | 12/1985 | Geczy ..................................... | 175/107 |
| 4,620,601 | 11/1986 | Nagel ..................................... | 175/107 |
| 4,793,828 | 12/1988 | Burnand .................................. | 51/293 |
| 4,797,011 | 1/1989 | Saeki et al. .............................. | 384/13 |
| 5,011,514 | 4/1991 | Cho et al. ................................ | 51/295 |
| 5,030,276 | 9/1991 | Sung et al. ............................... | 75/237 |
| 5,067,826 | 11/1991 | Lemelson ................................. | 384/492 |
| 5,092,687 | 3/1992 | Hall ........................................ | 384/303 |

FOREIGN PATENT DOCUMENTS 595630   5/1994   European Pat. Off. .

OTHER PUBLICATIONS

Wei et al "A Rolling Contact Fatigue Study of hard carbon coated M–50 Steel" Tribology Mfd. St. Louis Oct. 1991.

*Primary Examiner*—Archene Turner
*Attorney, Agent, or Firm*—Scully, Scott, Murphy & Presser

[57]             ABSTRACT

A diamond-bearing assembly comprises opposed diamond-bearing surfaces, at least one of which is free of any Group VIII metals such as cobalt. Preferably, each of the surfaces is provided by a surface of a diamond compact, such diamond compact containing substantial diamond-to-diamond bonding, and a second phase which contains silicon in the form of silicon and/or silicon carbide.

4 Claims, 1 Drawing Sheet

BEARING ASSEMBLY

This a continuation of applications Ser. No. 08/217,932 filed on Mar. 25, 1994 now abandoned.

BACKGROUND OF THE INVENTION

This invention relates to bearing assemblies.

Diamond-bearing assemblies are known and are used in various applications. One application of a diamond-bearing assembly is a downhole motor used in the drilling industry.

In diamond-bearing assemblies, the opposed bearing surfaces of the assembly are both made of a diamond material. The diamond material is polycrystalline diamond or PCD. This diamond material is also known in the art as a diamond compact. Such material is used because of its long wearing life and its ability to carry substantial load. The polycrystalline diamond which has been used for diamond-bearing assemblies is that known in the art as Syndite®, Syndrill® or Stratapax®. This polycrystalline diamond material contains substantial amounts of Group VIII metals such as cobalt, iron or nickel. Reference in this regard may be made to U.S. Pat. No. 4,620,601, column 12 lines 30 to 37, and U.S. Pat. No. 4,560,014, column 9 lines 29 to 44.

U.S. Pat. 5,092,687 describes diamond-bearing assemblies having opposed diamond-bearing surfaces. The diamond-bearing surfaces are provided by cemented tungsten carbide in which synthetic diamonds are bonded—column 3 lines 49 to 51. Cemented tungsten carbide has a Group VIII metal such as cobalt, nickel or iron as its binder.

It has been found that where a diamond-bearing assembly utilises a diamond material containing a Group VIII metal, as in the references described above, the friction behaviour of the contacting-bearing surfaces tends to become quite unpredictable during high contact pressures. In some cases, rapid seizure: of the bearing assembly occurs without adequate warning. This phenomenon is believed to be caused by a Group VIII-rich tribofilm which forms on the diamond surfaces during use of the bearing assembly.

SUMMARY OF THE INVENTION

According to the present invention, a bearing assembly comprises opposed, uninterrupted diamond bearing surfaces, at least one of which is free of any Group VIII metal.

At least one of the opposed diamond-bearing surfaces must be free of any Group VIII metal, and preferably both the surfaces are free of any Group VIII metal. The term "free of any Group VIII metal" means that there will be substantially no Group VIII metal in that surface, although trace amounts of Group VIII metals may be present without resulting in a deleterious effect. Group VIII metals include cobalt, iron and nickel.

DESCRIPTION OF EMBODIMENTS

The invention provides a bearing assembly comprising opposed diamond bearing surfaces. The bearing assembly may be any known in the art. The invention has particular application to diamond thrust bearing assemblies for a downhole motor as used in the drilling industry. Examples of such bearing assemblies are described, for example, in U.S. Pat. No. 4,560,014 and European Patent Application No. 93308591.2. It has been found that the absence, or substantial absence, of Group VIII metal in at least one of the opposed diamond-bearing surfaces achieves a low friction coefficient of no greater than 0,1 and the ability to carry substantial loads equivalent to contact pressures of 68 MPa or greater.

It is preferred that both of the diamond-bearing surfaces are free of Group VIII metal.

The diamond-bearing surface which is free of Group VIII metal may be provided by a surface of any one of various diamond bodies. One such diamond body, and the preferred diamond body, is that which contains substantial diamond-to-diamond bonding and a second phase consisting essentially of silicon, the silicon being in the form of silicon and/or silicon carbide. The diamond content will generally be 80 to 90 percent by volume and the diamond-to-diamond bonding will generally be such as to form a coherent, skeletal mass. The silicon second phase will generally be present in an amount of 10 to 20 percent by volume. Examples of such diamond bodies can be found described in U.S. Pat. No. 4,151,686 and U.S. Pat. No. 4,793,828. Further, an example of such a body is that sold under the trade name Syndax®.

An example of another suitable diamond body which can provide a surface free, or substantially free, of Group VIII metal is one which contains self-bonded diamond particles in an amount of 70 percent to 95 percent by volume, and a network of interconnected, empty pores dispersed through the body. The body may contain a minor amount of metallic phase infiltrated substantially uniformly throughout the body. Such a diamond body is known as a leached diamond compact and an example is described in U.S. Pat. No. 4,224,380.

The diamond surface free of Group VIII metal may also be provided by the surface of a diamond film produced by chemical vapour deposition (CVD). CVD diamond films are produced on substrates such as silicon carbide, tungsten carbide arid the like. The production of CVD diamond films is well known in the art and involves dissociating a gaseous carbon compound to produce carbon atoms, ions or radicals which are allowed to deposit on a surface of a substrate to form the diamond film.

The diamond surface free of Group VIII metal may also be provided by the surface of a diamond compact, produced under diamond synthesis conditions, which comprises at least 70 percent by volume, preferably 80 to 90 percent by volume, diamond, substantial diamond-to-diamond bonding and a second phase which consists of an alkaline earth metal carbonate, particularly calcium carbonate.

Figure 1:
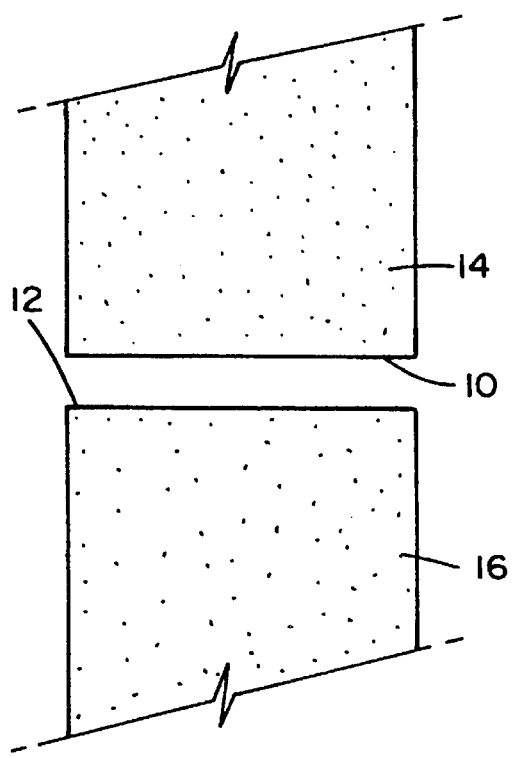
FIGS. 1 and 2 illustrate diagrammatic sectional views of opposed diamond-bearing surfaces of two embodiments of bearing assemblies of the invention.

Two embodiments of the invention will now be described with reference to the accompanying drawings. Referring first to FIG. 1, there is shown a bearing assembly comprising opposed, uninterrupted bearing surfaces 10 and 12. The bearing surfaces 10 and 12 each form one surface of diamond compacts 14 and 16. The diamond compacts may both be free of any Group VIII metal. Alternatively, at least one of these compacts must be free of any Group VIII metal so that at least one of the bearing surfaces 10, 12 is free of such metal.

Figure 2:
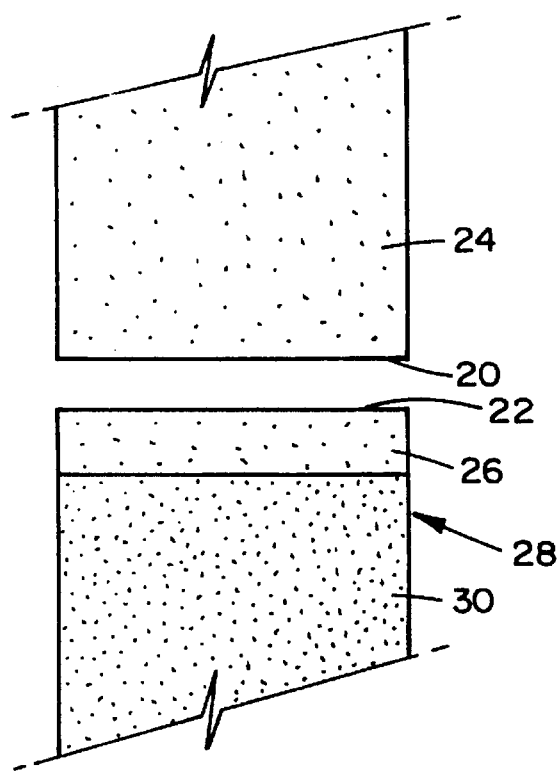

Referring now to FIG. 2, the opposed bearing surfaces of a bearing assembly are defined by surfaces 20 and 22. Bearing surface 20 forms one surface of a diamond compact 24. Bearing surface 22 forms one surface of a diamond end zone 26 of a body 28. The diamond end zone 26 may be constituted by leached diamond compact, Syndax® or by a layer of CVD diamond. The zone 26 is bonded to a substrate 30 which may be a diamond-containing body such as a diamond compact, or it may be made of a different material, e.g. cemented carbide.

In another embodiment (not shown) the diamond compact 24 can be replaced by a composite diamond-containing body similar to that of the body 28.

A series of tests were carried out using various diamond bearing surfaces. A pin-on-disc tribometer was utilised to generate a unidirectional sliding motion. In the machine, the one component of the sliding couple (pin) was fixed in a sample holder on a cantilever load arm. The pin was allowed to slide on a horizontal disc or ring on a turntable drive by a fixed or variable speed motor. The load on the pin could be varied and was applied by means of dead weights on the load arm.

The products used were Syndrill®, a diamond compact or PCD containing about 10 percent by mass of cobalt uniformly dispersed or distributed through the bonded diamond mass, and Syndax®, a diamond body containing substantial diamond-to-diamond bonding and a second phase consisting essentially of silicon, the silicon being in the form of silicon and/or silicon carbide. Various tests were carried out in which both the pin and disc were made of Syndrill®, both pin and disc were made of Syndax® and one of the pin and disc made of Syndrill® and the other of Syndax®.

In a dry, unlubricated, sliding test the lowest friction coefficient was achieved when both the pin and disc were made of Syndax®. It was found that such an arrangement showed a low friction coefficient of no greater than 0,1 and a high load carrying capacity of at least 4300N which is equivalent to a contact pressure of at least 68 MPa. This is in marked contrast to the results achieved when both the pin and disc were made of Syndrill® which showed much higher friction coefficients of 0,13 to 0,26 and a lower load carrying capacity (approximately 2800N which is equivalent to a contact pressure of 44 MPa). In this latter case, a cobalt-rich tribofilm was found to have formed on the sliding surfaces. This, it is believed, was the cause of the high friction coefficients. Removal of such tribofilms, e.g. using HCl, temporarily reduced the friction coefficient until the film reformed.

In a further series of tests, the pin was made of Syndax® and the disc Syndrill® and vice versa. Again, dry, unlubricated, sliding conditions were used. It was found that this combination showed lower friction coefficients than that with the Syndrill/Syndrill® combination. Further, although a tribofilm was observed between the bearing surfaces this film contained primarily silicon and only a small amount of cobalt. Thus, there was evidence that the silicon suppressed formation of the deleterious cobalt-rich tribofilm leading to a lower friction coefficient.

A similar series of tests were carried out using water as a lubricant. The Syndrill/Syndrill® couple was found to exhibit a poor load carrying capacity of only 2800N although the friction coefficients obtained were low and of the order of 0,1. The Syndax/Syndax® couple exhibited much the same behaviour as in the unlubricated, sliding tests, i.e. low friction coefficients of no greater than 0,1 and high load carrying capacities of greater than 4300N which is equivalent to contact pressures of greater than 68 MPa.

We claim:

1. A bearing assembly comprising opposed, uninterrupted diamond-bearing surfaces, both of which are free of any Group VIII metal.

2. A bearing assembly according to claim 1 wherein each of the opposed diamond-bearing surfaces is provided by a surface of a diamond body containing substantial diamond-to-diamond bonding, and a second phase consisting essentially of silicon, the silicon being in the form of silicon and/or silicon carbide.

3. A bearing assembly according to claim 1 wherein each diamond-bearing surface, which is free of any Group VIII metal, is provided by the surface of a diamond body which comprises self-bonded diamond particles present in an amount of 70 percent to 95 percent by volume of the body, and a network of interconnected, empty pores dispersed through the body.

4. A bearing assembly according to claim 1 wherein each diamond-bearing surface, which is free of any Group VIII metal, is provided by a surface of a CVD diamond film.

* * * * *

UNITED STATES PATENT AND TRADEMARK OFFICE
CERTIFICATE OF CORRECTION

PATENT NO. : 5,560,716
DATED : October 1, 1996
INVENTOR(S) : Klaus Tank, et al.

It is certified that error appears in the above-indentified patent and that said Letters Patent is hereby corrected as shown below:

Column 1, line 48 : "terra" should read --term--

Column 2, line 40: "arid" should read --and--

Column 3, line 4 : after "different" delete --:--

Signed and Sealed this

Twentieth Day of May, 1997

Attest:

BRUCE LEHMAN

Attesting Officer
Commissioner of Patents and Trademarks